(12) United States Patent
Lin et al.

(10) Patent No.: US 8,581,848 B2
(45) Date of Patent: Nov. 12, 2013

(54) HYBRID POINTING DEVICE

(71) Applicant: PixArt Imaging Inc., Hsin-Chu (TW)

(72) Inventors: Cho-Yi Lin, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 13/681,891

(22) Filed: Nov. 20, 2012

(65) Prior Publication Data

US 2013/0076629 A1 Mar. 28, 2013

Related U.S. Application Data (63) Continuation-in-part of application No. 12/770,875, filed on Apr. 30, 2010, and a continuation-in-part of application No. 12/119,641, filed on May 13, 2008, now Pat. No. 8,339,380.

(51) Int. Cl.
*G06F 3/033* (2013.01)

(52) U.S. Cl.
USPC ......... 345/166; 345/163; 345/173; 178/18.11

(58) Field of Classification Search
USPC .............. 345/156–178; 178/18.09, 18.11
See application file for complete search history.

(56) References Cited

U.S. PATENT DOCUMENTS

| | | | |
|---|---|---|---|
| 4,484,179 A | 11/1984 | Kasday | |
| 4,589,140 A | 5/1986 | Bishop et al. | |
| 4,782,328 A | 11/1988 | Denlinger | |
| 5,484,966 A | 1/1996 | Segen | |
| 6,816,537 B2 | 11/2004 | Liess | |
| 7,956,842 B2 | 6/2011 | Ting | |
| 2004/0046741 A1 | 3/2004 | Low et al. | |
| 2007/0152966 A1 | 7/2007 | Krah et al. | |
| 2008/0007540 A1 | 1/2008 | Ostergaard | |
| 2008/0029691 A1 * | 2/2008 | Han | 250/224 |
| 2008/0088593 A1 | 4/2008 | Smoot | |
| 2008/0150913 A1 | 6/2008 | Bell et al. | |
| 2008/0179507 A2 * | 7/2008 | Han | 250/224 |
| 2008/0259053 A1 | 10/2008 | Newton | |
| 2009/0090569 A1 | 4/2009 | Lin | |
| 2010/0265178 A1 | 10/2010 | Benko et al. | |

FOREIGN PATENT DOCUMENTS

| | | |
|---|---|---|
| TW | 200601127 | 1/2006 |
| TW | 200705249 | 2/2007 |
| TW | M316972 | 8/2007 |
| TW | 200813793 | 3/2008 |

\* cited by examiner

*Primary Examiner* — Dmitriy Bolotin
(74) *Attorney, Agent, or Firm* — Lowe, Hauptman & Ham (57) ABSTRACT

There is provided a hybrid pointing device including an optical navigation module, a pointing module and a switching module. The optical navigation module is configured to sense gestures of at least one object operated by a user to activate commands associated with particular programs running on the host. The pointing module is configured to detect a movement between the hybrid pointing device and a working surface. The switching module is configured to active the optical navigation module or the pointing module according to a deformation of a touch plate.

18 Claims, 8 Drawing Sheets

HYBRID POINTING DEVICE

CROSS REFERENCE TO RELATED APPLICATION

This application is a continuation-in-part application of U.S. Ser. No. 12/119,641, filed on May 13, 2008 and U.S. application Ser. No. 12/770,875, filed on Apr. 30, 2010, the full disclosure of which are incorporated herein by reference.

BACKGROUND

1. Field of the Disclosure

This disclosure generally relates to a hybrid pointing device and, more particularly, to a hybrid pointing device including an optical navigation module configured to sense a gesture of at least one finger and a pointing module configured to sense a movement of the hybrid pointing device relative to a surface.

2. Description of the Related Art

For a conventional pointing device, e.g. an optical mouse and a trackball mouse, a pointer shown on a display of a host is controlled by a relative displacement between the pointing device and a surface. The pointing device generally includes two buttons (left and right buttons) for activating commands associated with the movement of the pointer on the display. Usually, when a user wants to execute a program, drag an icon, modify a picture, etc., the user moves the pointer on the display and points the pointer on a particular graphic user interface (GUI) and then presses at least one button to activate commands. To enhance the applications of conventional pointing devices, some pointing devices are provided with more than two buttons; therefore, the user may define particular functions activated by pressing the additional buttons or by pressing several buttons simultaneously associated with moving the pointer on the display.

However, too many buttons integrated on a pointing device may confuse the user since the user can only operate the buttons with at most five fingers one time. For example, when the user tries to press as many buttons as he or she can, the user may hardly move the pointing device to move the pointer on the display.

There is another kind of pointing device which applies an optical sensor module in replace of the conventional mouse. The optical sensor module is configured to emit light to the finger and receive the reflected light from the finger for sensing a movement of the finger thereby controlling the pointer on the display. This kind of pointing device is compact and the sensing area is relatively small, which is disadvantaged in low resolution, hard to precisely control the pointer, hard to move the pointer fast, etc.

Recently, a kind of pointing device having a capacitive touch module (CTM) or a resistive touch module (RTM) is provided. The CTM or RTM is applied to sense the touching motion of fingers for activating commands. More particularly, the CTM or RTM includes a sensor array uniformly distributed over a sensing area. When the fingers properly touch on the sensing area, the touching motion will cause an electrical variation of the sensor array that indicates the touched position on the sensor array. However, to ensure correct detection of fingers, the whole CTM or RTM has to maintain in function-well condition. Once a portion of the CTM or RTM is failed, the movement of fingers cannot be detected correctly. Furthermore, fingers have to substantially touch the CTM or RTM strong enough to be sensed by the pointing device. All of these properties limit the application of the technologies.

Thus, it is important to provide a pointing device that may activate commands in various ways without using buttons and move precisely for better control.

SUMMARY

The present disclosure provides a hybrid pointing device including an optical navigation module and a pointing module. The pointing module is configured to sense a movement of the hybrid pointing device relative to a surface for moving a pointer on a display. The optical navigation module is configured to replace the conventional buttons of a conventional pointing device, such as an optical mouse or a trackball mouse. The optical navigation module is configured to sense gestures of at least one finger of a user to activate commands associated with particular programs running on a host. Since the optical navigation module is only configured to sense gestures of the finger but not the movement of the hybrid pointing device relative to the surface, the resolution of the optical navigation module is aimed to be sufficiently high enough for sensing gestures and no need to relatively high.

The hybrid pointing device of the present disclosure further includes a switching module configured to switch between the optical navigation module and the pointing module according to a deformation of a touch plate.

Since the optical navigation module may be operated in many ways, such as sliding at least one finger, posing a gesture, multi-touching of fingers, clicking of at least one finger, rotating at least one finger, etc., the optical navigation module provides a more instinctive way of operating the pointer on the display rather than conventional pointing devices in which a user may only choose press or not to press buttons thereon to activate commands.

The optical navigation module of the present disclosure includes at least one image sensor and at least one light source. The light source emits light and at least one object operated by a user reflects the emitted light to be received by the image sensor. Since different motions of gestures of the object cause different images on the image sensor, the optical navigation module then transforms the images into electric signals for controlling the pointer shown on a display or for activating particular programs running on a host.

The hybrid pointing device of the present disclosure is for being operated by a user on a surface. The hybrid pointing device includes a transparent touch plate, a first module, a second module and a processor. The transparent touch plate is on a top surface of the hybrid pointing device. The first module is configured to sense a movement of the hybrid pointing device relative to the surface. The second module includes a light source and an image sensor. The light source is configured to emit light beams to the transparent touch plate. The image sensor is configured to capture an image covering the transparent touch plate. The processor is configured to detect a deformation of the transparent touch plate when at least one finger of the user presses thereon and to identify gestures according to a position information of at least one light spot in the image caused by the at least one finger in contact with the transparent touch plate.

The hybrid pointing device of the present disclosure is for being operated by a user on a surface. The hybrid pointing device includes a transparent touch plate, a light source, a first image sensor, a second image sensor and a processor. The transparent touch plate is on a top surface of the hybrid pointing device. The light source is configured to illuminate the transparent touch plate. The first image sensor is configured to capture a first image of the surface. The second image sensor is configured to capture a second image covering the transparent touch plate. The processor is configured to calculate a movement of the hybrid pointing device relative to the surface according to the first image, to detect a deformation of the transparent touch plate according to the second image and to identify gestures according to a position information of at least one light spot in the second image caused by at least one finger of the user in contact with the transparent touch plate.

In one aspect, the processor starts to identify the gestures when the deformation is identified to be larger than a threshold of deformed size.

In one aspect, when the deformation is smaller than a threshold of deformed size, the first image sensor has a higher sampling frequency than the second image sensor.

In one aspect, when the deformation is higher than a threshold of deformed size, a sampling frequency of the second image sensor is increased.

In an aspect of the present disclosure mentioned above, the position information of the light spot on the image is retrieved from a look-up table formed by dividing a field of view of the image sensor into a matrix of a plurality of sub-areas and pre-stored in the processor.

The present disclosure is able to be integrated with the conventional structure of optical mouse or trackball mouse by adding the optical navigation module of the present disclosure and changing related periphery devices. In an aspect of the present disclosure, the first module and the second module included in the hybrid pointing device may share the same light source.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

In the descriptions that follow, the present disclosure will be described in reference to the embodiments that describe a hybrid pointing device with optical navigation module for replacing the conventional pointing device with buttons. However, embodiments of the present disclosure are not limited to any particular environment, application or implement. Therefore, the descriptions of the embodiments that follow are for purpose of illustration and not limitation. It is understood that elements indirectly related to the present disclosure are omitted and are not shown in the following embodiments and drawings.

The following figures show several examples of the present disclosure, which are shown similar to conventional mouse. That is, the hybrid pointing devices of the present disclosure shown below are intended to be placed on a smooth working surface, and the hybrid pointing devices include a pointing module that emits light to the working surface and receives the reflected light from the working surface for controlling the motion of a pointer shown on a display of a host according to a movement of the hybrid pointing device relative to the working surface. In other embodiment, the pointing module may be replaced by other equipment, such as a trackball mouse module. People skilled in the art know well the functions of conventional pointing modules and redundant explanation is omitted hereinafter.

Figure 1:
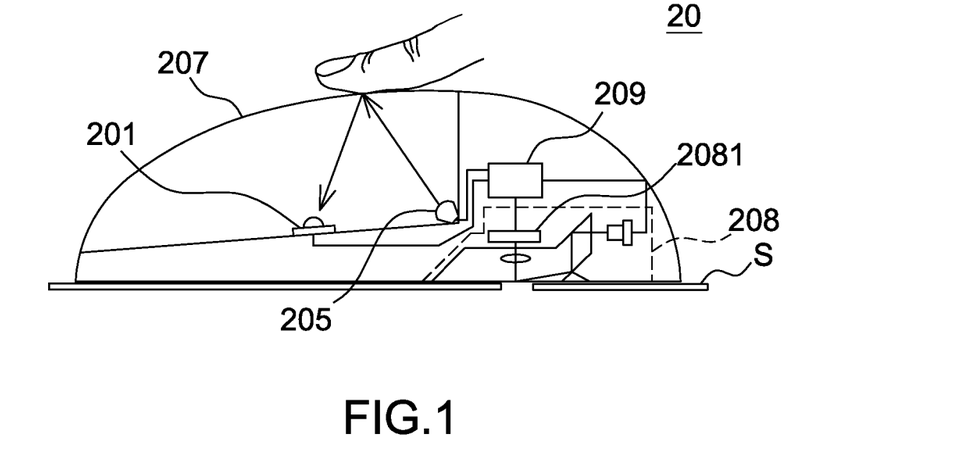
FIG. 1 shows a schematic diagram of the hybrid pointing device according to an embodiment of the present disclosure.

FIG. 1 shows a schematic diagram of a hybrid pointing device 20 according to an embodiment of the present disclosure. The hybrid pointing device 20 is for being operated by a user (shown by a finger) on a working surface S and includes an image sensor 201, a light source 205 and a processor 209 electrically connected to the image sensor 201 and a pointing module 208, wherein the optical navigation module of the present disclosure may include the image sensor 201, the light source 205 and the processor 209 and the pointing module 208 may include an image sensor 2081 configured to capture images of the working surface S for calculating the movement. It is noted that the number of the light source and the image sensor shown in FIG. 1 is not the limitation of the present disclosure. The hybrid pointing device 20 further includes an operation field 207, which is referred to a surface of a transparent touch plate on a top surface of the hybrid pointing device 20, for a user to place at least one finger and move the finger thereon. In this embodiment, the pointing module 208 is shown as a conventional optical mouse module. For other embodiments, the pointing module 208 may be a conventional TV remote controller module.

In one embodiment, the operation field 207 preferably locates at a top front surface of the hybrid pointing device 20 such that the hybrid pointing device 20 only detects a finger or fingers without detecting the palm of user. The image sensor 201 is configured to capture images covering the operation field 207 of the hybrid pointing device 20. The light source 205 emits light beams to the transparent touch plate and the finger of user reflects the emitted light as shown in FIG. 1. Then the reflected light is received by the image sensor 201. The processor 209 is then able to identify the position of the finger or fingers on the operation field 207 and continuously track the movement of the finger thereon based on any conventional coordinate systems, such as a polar coordinate system or a Cartesian coordinate system. In this embodiment, the processor 209 may also electrically connect to the pointing module 208 for processing the data therefrom so as to calculate the movement sensed by the pointing module 208 according to the images captured by the image sensor 2081 if the pointing module is an optical mouse module. However, in other embodiment, the pointing module 208 may include another processor operating separately. The light source 205 may be illuminated by the light source of the pointing module 208 via particular light guiding mechanism or vice versa, i.e. the optical navigation module and the pointing module 208 may share the same light source. The light source 205 may be an independent light source from the pointing module 208 in other embodiment. It is appreciated that positions of the light source 205 and the image sensor 201 and shapes of the operation field 207 shown in FIG. 1 are only exemplary.

The tracking data are used to activate particular commands. For example, if the touched finger moves toward right side, the optical navigation module can retrieve the tracking data and activate a command of scrolling the on-viewing page. If two touched fingers move apart or closer, the tracking data may be configured to activate a command of enlarging or shrinking the on-viewing screen or picture. If at least one touched finger moves clockwise or counterclockwise, the tracking data may be configured to rotate the on-viewing screen or picture. Furthermore, the user can set desired commands corresponding to particular motions of fingers.

Moreover, since different motions of gestures of at least one finger cause different images on the image sensor 201, the user may activate commands according to different gestures of at least one finger by technologies of image identification. When there is no finger on the operation field 207, the light emitted from the light source 205 will go outward and the image sensor 201 cannot sense any reflected light from the operation field 207, i.e. the touch plate is transparent to the light emitted by the light source 205. When the user puts at least one finger on the operation field 207, the light emitted from the light source 205 will be reflected from the surface between the touched finger and the operation field 207 and causes at least one gradual light spot on the image sensed by the image sensor 201. The processor 209 may identify gestures according to a position information of at least one light spot in the image caused by the at least one finger in contact with the touch plate and then transform the images into electric signals for controlling the pointer shown on a display or for activating particular programs running on a host.

Generally, strength of the image signal is proportional to the intensity of the reflected light received by the image sensor 201. The processor 209 may identify a relative distance between the finger and the light source 205 according to the variation of the light spot of the image and to generate a positional signal of the finger. However in some conditions, the reflected light may have too strong intensity before the object (i.e. finger) really touches the operation field 207 and causes misoperation. Therefore, the hybrid pointing device 20 of the present disclosure further includes an optical operating apparatus 100 served as a switching module configured to identify whether the finger is indeed in contact with the operation field 207 or not.

The processor 209 may be configured to detect a deformation of the touch plate when at least one finger of the user presses thereon according to the images captured by the image sensor 201. After the contact event is confirmed according to the deformation, the operation of the hybrid pointing device 20 then switches from the pointing module 208 to the optical navigation module; i.e. if the contact event does not occur, the pointing module 208 functions to detect the movement of the hybrid pointing device 20 with respect to the working surface S and if the contact event occurs, the optical navigation module functions to detect finger gestures. In other words, the optical operating apparatus 100 is configured to trigger the switching between the optical navigation module and the pointing module 208; for example, the pointing module 208 may be activated when the deformation of the touch plate is smaller than a threshold of deformed size and the optical navigation module may be activated when the deformation of the touch plate is larger than the threshold of deformed size (described later). It should be mentioned that the activation of the pointing module 208 means that the processor 209 calculates the movement of the hybrid pointing device 20 with respect to the working surface S according to the images captured by the image sensor 2081 to accordingly control the display and the activation of the optical navigation module means that the processor 209 starts to identify the gestures according to the images captured by the image sensor 201 to accordingly control the display. In one aspect, when the optical navigation module is activated, the pointing module 208 (and the image sensor 2081) may or may not keep on working. In one aspect, when the deformation is smaller than a threshold of deformed size, both image sensors 201 and 2081 are activated but the image sensor 2081 may have a higher sampling frequency than the sampling frequency of the image senor 201. In one aspect, when the deformation is higher than a threshold of deformed size, a sampling frequency of the image sensor 201 is increased; that is, the image sensor 201 has a low sampling frequency when the deformation is smaller than the threshold of deformed size and has a high sampling frequency when the deformation is larger than the threshold of deformed size.

Figure 3:
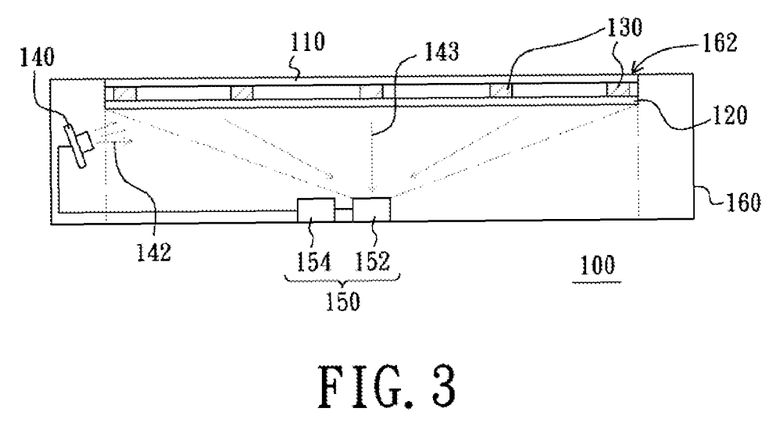
FIG. 3 shows a schematic view of an optical operating apparatus of an embodiment of the present disclosure.
Figure 4:
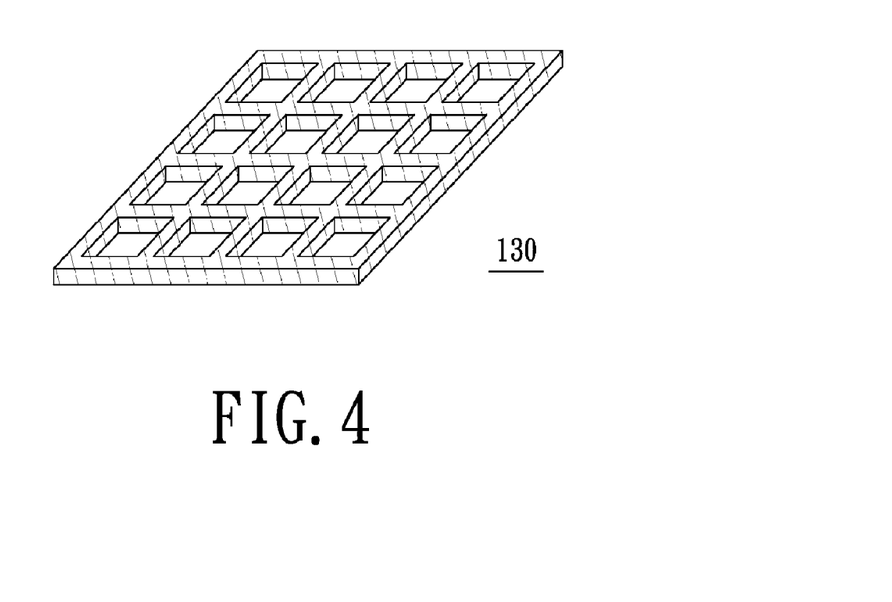
FIG. 4 shows a three-dimensional view of a deformable unit of the optical operating apparatus of FIG. 3.
Figure 14:
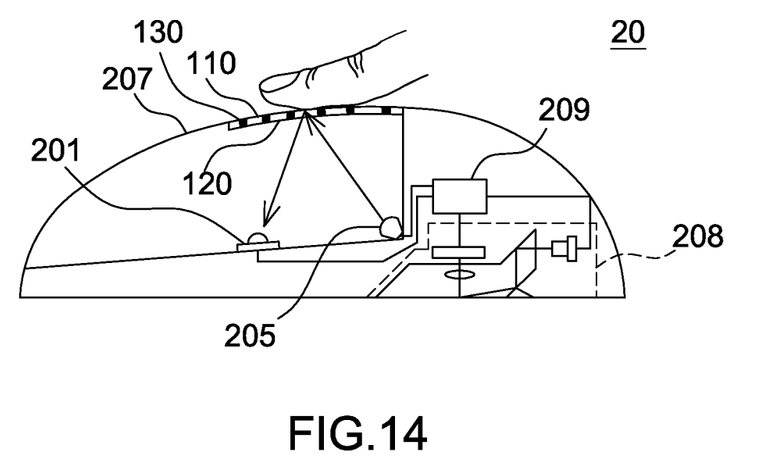
FIGS. 14-15 respectively show another schematic diagram of the hybrid pointing device according to an embodiment of the present disclosure.
Figure 15:
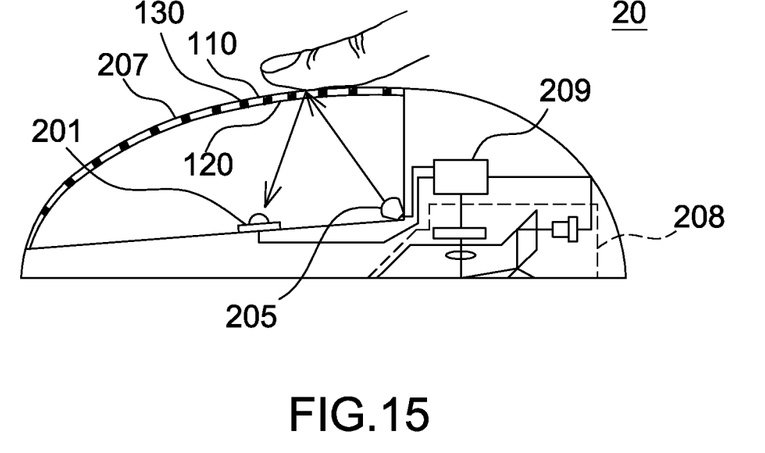

Referring to FIGS. 3 and 4, the optical operating apparatus 100 may be served as the switching module of the present disclosure and configured to activate the optical navigation module and/or the pointing module. The optical operating apparatus 100 includes a soft plate 110, a transparent supporting plate 120, a deformable unit 130, at least a light source 140 and an image sensing module 150. The soft plate 110 is configured for being pressed by at least one finger of the user. The transparent supporting plate 120 is disposed under the soft plate 110. The deformable unit 130 is arranged between the soft plate 110 and the transparent supporting plate 120, and has a pattern configuration (e.g., a predetermined reticular configuration). The deformable unit 130 deforms as applying an external force on the soft plate 110 (such as being pressed by at least one finger of the user) and restores after the external force (such as the at least one finger) is removed. The light source 140 is configured for providing light beams 142 to the transparent supporting plate 120 and the deformable unit 130, and a part of the light beams 142 can be reflected by the deformable unit 130. That is, if no finger is pressed on the soft plate 110, a part of the light beams 142 can pass through the transparent supporting plate 120 and the soft plate 110 to outside of the optical operating apparatus 100. The image sensing module 150 is arranged on a transmitting path of the light beam 143 reflected by the deformable unit 130, and a visual field (i.e., a sensing range) of the image sensing module 150 preferably covers the whole deformable unit 130. In one aspect, the light source 140 may be the light source 205 shown in FIG. 1 or an individual light source separated from the light source 205. In one aspect, the soft plate 110 may be a part of the touch plate as shown in FIG. 14 or may be an entire of the touch plate as shown in FIG. 15.

In the above-described optical operating apparatuses 100, the image sensing module 150 can be arranged under the transparent supporting plate 120. The image sensing module 150 includes a sensing element 152 and a processing element 154. The processing element 154 is electrically connected between the sensing element 152 and the light source 140. The visual field of the sensing element 152 covers the whole deformable unit 130. The sensing element 152 may be a complementary metal-oxide-semiconductor (CMOS) image sensor or a charge coupled device (CCD). Moreover, the sensing element 152 and the processing element 154 can be integrated into a system-on-chip (SoC). In one aspect, the sensing element 152 may be the image sensor 201 shown in FIG. 1 or another individual image sensor. In one aspect, the processing element 154 may be the processor 209 shown in FIG. 1 or another individual processing unit.

In addition, the optical operating apparatuses 100 can additionally include a housing 160. The housing 160 has an opening 162, and the soft plate 110 is disposed at the opening 162. The transparent supporting plate 120, the deformable unit 130, the light source 140 and the image sensing module 150 are disposed inside the housing 160. When the optical operating apparatus 100 is incorporated into a portable electronic product, the housing 160 can be integrated with a case of the portable electronic product. For example, if the optical operating apparatus 100 is incorporated into the hybrid pointing device 20 shown in FIG. 1, the housing 160 may be integrated with a case thereof, and the soft plate 110, the transparent supporting plate 120 and the deformable unit 130 may be at least a part of the touch plate thereof; that is, the soft plate 110 may be served as a part of or an entire of the operation field 207 thereof.

The light source 140 may be a light emitting diode (LED) or a laser diode (LD). The soft plate 110 may be comprised of plastic, rubber, thermoplastic elastomer (TPE), or other flexible or elastic materials and is transparent to the light beams emitted by the light source 140. The transparent supporting plate 120 may be comprised of glass, polyacrylate, resin, rubber, TPE or other transparent materials. The deformable unit 130 is comprised of an elastic material such as silica gel, latex, sponge, rubber, TPE or the like.

In the present embodiment, because the deformable unit 130 is fixed between the soft plate 110 and the transparent supporting plate 130, when at least one finger of the user presses the soft plate 110, the soft plate 110 and the deformable unit 130 deform accordingly. Furthermore, the light beam 143 reflected by the deformable unit 130 transmits to the image sensing module 150. The light beam 143 is converted into an image data by the image sensing module 150. According to compare the image data got in different times, whether the deformable unit 130 deforms or not is determined, and the deformed position of the deformable unit 130 is determined According to the determining result, the cursor or game role in the screen can be managed to do a corresponding motion.

Figure 5:
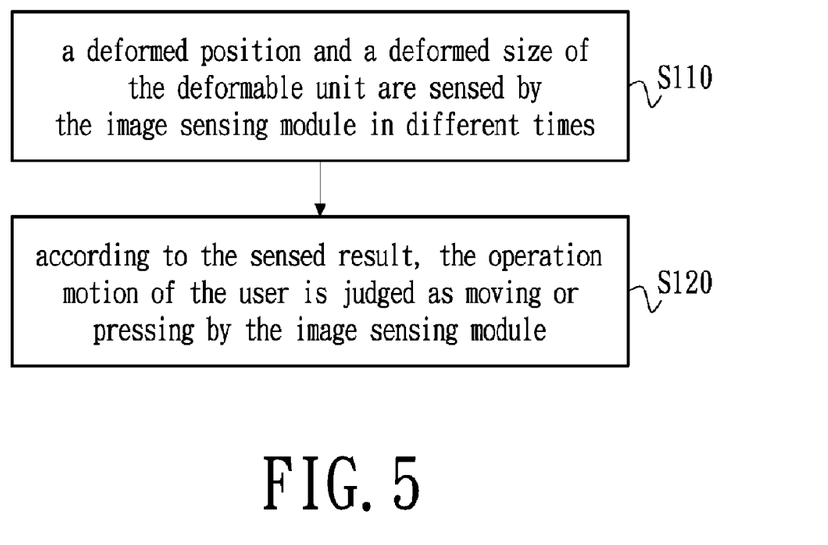
FIG. 5 shows a flowchart of a method for determining operation motion of an embodiment of the present disclosure.

In detail, a method for determining operation motion is applied to the optical operating apparatuses 100. The method for determining operation motion includes the following steps. Referring to FIG. 5, in step S110, a deformed position and a deformed size of the deformable unit 130 are sensed by the image sensing module 150 in different times. In step S120, according to the sensed result of Step 110, the operation motion of the user is determined as moving or pressing by the image sensing module 150.

Figure 6A:
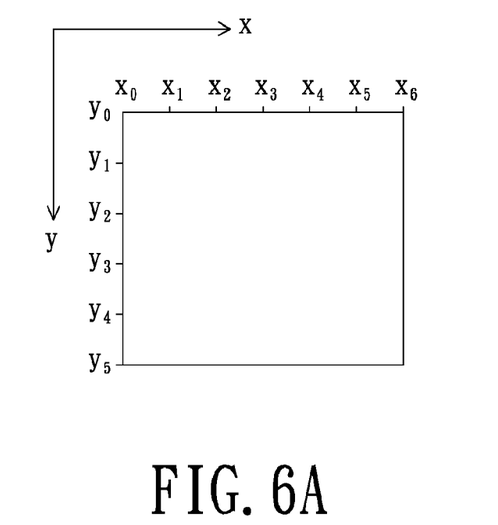
FIG. 6A shows a schematic view of a sensing visual of an image sensing module of an optical operating apparatus of an embodiment of the present disclosure.
Figure 6B:
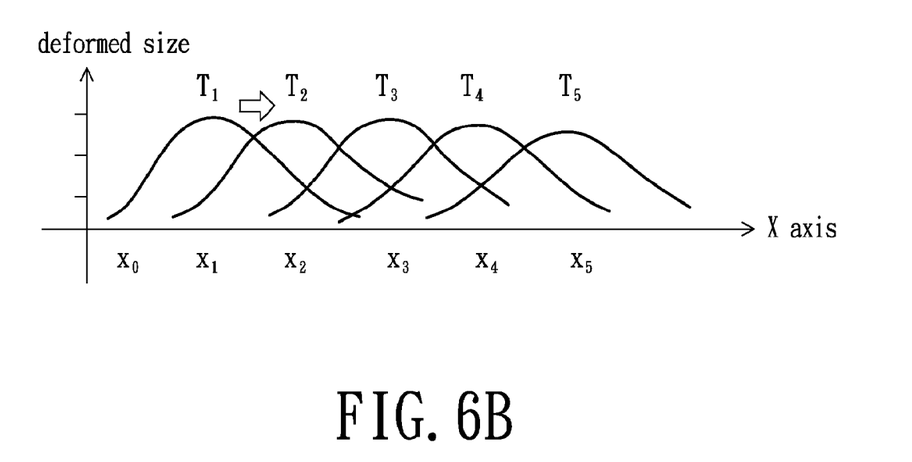
FIG. 6B shows a schematic diagram of waves sensed by the image sensing module in different times.

For example, referring to FIG. 6A, it shows the visual field of the image sensing module 150 corresponding to the deformable unit 130. In a time $T_1$, a position of the deformable unit 130 corresponding to a position $X_1$ of the image sensing module 150 is pressed and deformed, then the position $X_1$ on X axis of the image sensing module 150 senses a wave (as shown in FIG. 6B). In a time interval from $T_2$ to $T_5$, the wave sensed by the image sensing module 150 moves from $X_1$ to $X_5$, which means that the position of the deformable unit 130 pressed by the user moves from left to right along the X axis, therefore, the cursor or the game role in the screen generates a corresponding motion (i.e., moves from left to right) along the X axis. Similarly, when the wave sensed by the image sensing module 150 moves along the Y axis, the cursor or the game role in the screen can be controlled by the image sensing module 150 to generate a corresponding motion along the Y axis. In other words, when the deformed position of the deformable unit 130 changes along with time, the image sensing module 150 determines the motion of the user as a moving thereby controlling the cursor or the game role in the screen to generate a corresponding moving motion.

Figure 7:
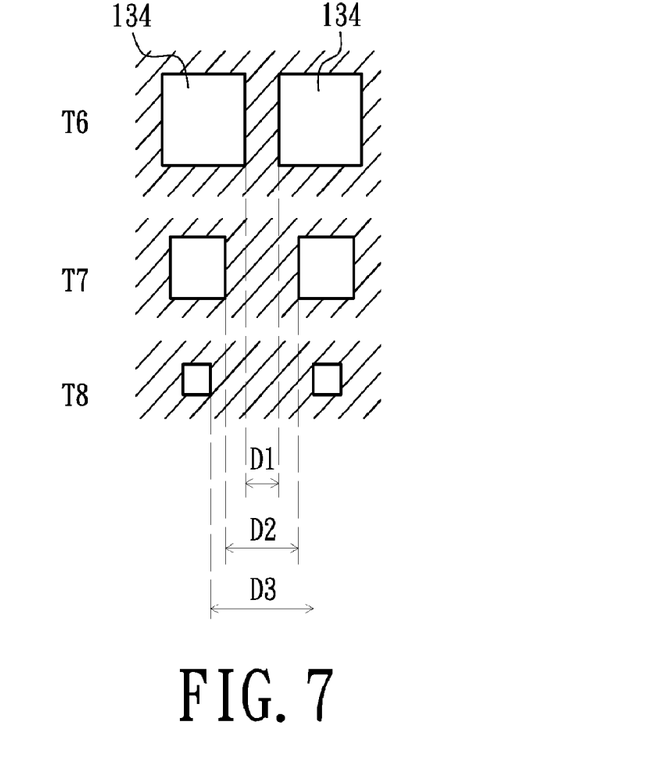
FIG. 7 shows a view of a deformed size of a deformable unit in different times.

In addition, when a portion of the deformed size of the deformable unit 130 changes along with time, the operation motion of the user can be determined as a pressing. The larger the pressure force pressed on the soft plate 110 and the deformable unit 130, the larger the deformed size of the soft plate 110 and the deformable unit 130. So, at least one critical deformed size can be predetermined and acted as a reference to determine which operation motion occurs on the soft plate 110. When a current deformed size excesses the predetermined critical deformed size, the predetermined operation motion corresponding to the predetermined critical deformed size can be determined For example, referring to FIG. 7, a predetermined space between two adjacent openings 134 is denoted by D1. When the deformable unit 130 is pressed, D1 is changed correspondingly. For example, in a time T7 and a time T8, because the deformable unit 130 is pressed by different pressure forces (i.e., values of the pressure forces are different), the space between the two adjacent openings 134 is separately changed into D2 and D3. If a first predetermined critical deformed size Th1 and a second predetermined critical deformed size Th2 are defined, and D1, D2, D3, Th1 and Th2 meet a relationship: D1<Th1<D2<Th2<D3. In the time T7, because D2>Th1, therefore, the operation motion is determined to be the first predetermined operation motion. In the time T8, because D3>Th2, therefore, the operation motion is determined to be the second predetermined operation motion.

The optical operating apparatus 100 of the present embodiment employs an optical manner to sense the pressure force provided by the user, therefore, any operating error caused by static electronic force or humidity can be prevented. In addition, the pressure force presses the soft plate 110 and the deformable unit 130, and the image sensing module 150 is not pressed, thereby avoiding a damage of the image sensing module 150. Therefore, the optical operating apparatus 100 of the present embodiment has a high reliability. Moreover, because the larger the pressure force pressed on the soft plate 110 and the deformable unit 130, the larger the deformed size of the soft plate 110 and the deformable unit 130. Therefore, the optical operating apparatus 100 can be used as a weighing machine. In addition, in this embodiment it is able to determine whether the user is pressing on the soft plate 110 by comparing the deformation of the touch plate (including the soft plate 110 and the deformable unit 130) with a threshold of deformed size.

Figure 8:
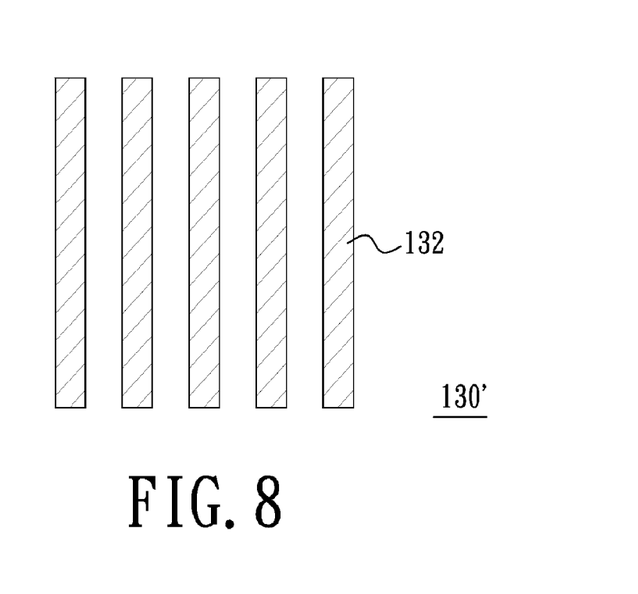
FIG. 8 shows a top view of a deformable unit in accordance with another embodiment of the present disclosure.

It is noted that the pattern configuration of the deformable unit 130 is not limited to be reticular configuration. For example, referring to FIG. 8, in another embodiment, the deformable unit 130' of another optical operating apparatus is composed of a number of multi-line shaped structure 132.

Several embodiments of the optical operating apparatuses will be recited in the following. These optical operating apparatuses have similar configuration and merits with the above-mentioned optical operating apparatus 100, therefore, only the difference between the optical operating apparatuses and the optical operating apparatus 100 is separately described in the following.

Figure 9:
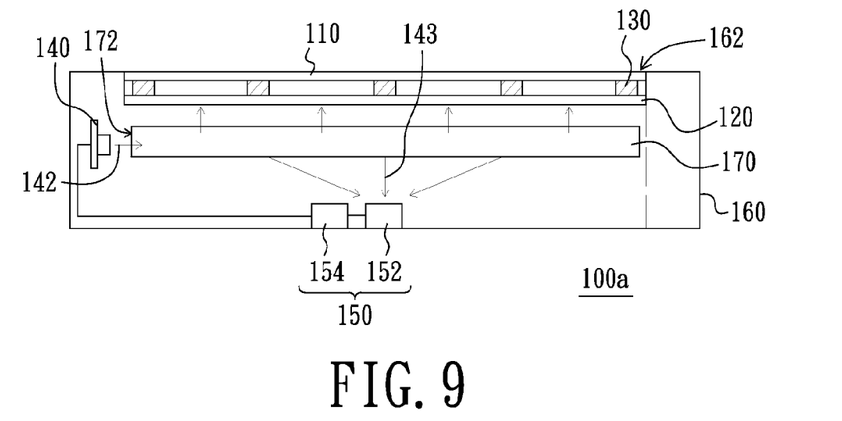
FIG. 9 shows a schematic view of an optical operating apparatus in accordance with another embodiment of the present disclosure.

Referring to FIG. 9, compared with the optical operating apparatus 100 of FIG. 3, the optical operating apparatus 100*a* of the present embodiment additionally includes a light guide plate 170. The light guide plate 170 is disposed between the transparent supporting plate 120 and the image sensing module 150. The light source 140 is arranged adjacent to a light incident surface 172 of the light guide plate 170. The light guide plate 170 can guide the light beam 142 provided by the light source 140 to the deformable unit 130, thereby facilitating the image sensing module 150 determining the deformation of the deformable unit 130.

Figure 10:
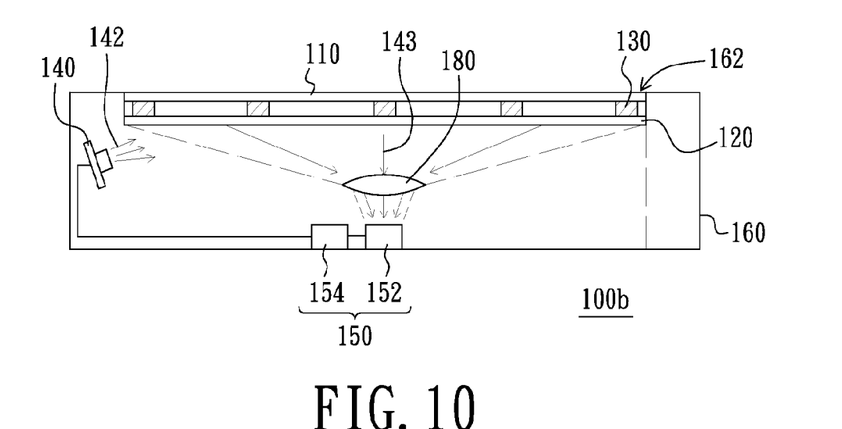
FIG. 10 shows a schematic view of an optical operating apparatus in accordance with another embodiment of the present disclosure.

Referring to FIG. 10, compared with the optical operating apparatus 100 of FIG. 3, the optical operating apparatus 100*b* of the present embodiment additionally includes at least a lens 180. The lens 180 is disposed between the transparent supporting plate 120 and the image sensing module 150, and configured for focus the light beam 143 on the image sensing module 150. Because the lens 180 has a large viewing angle, a distance between the image sensing module 150 and the deformable unit 130 can be shorten due to the exist of the lens 180. Therefore, a thickness of the optical operating apparatus 100*b* can be reduced.

Figure 11:
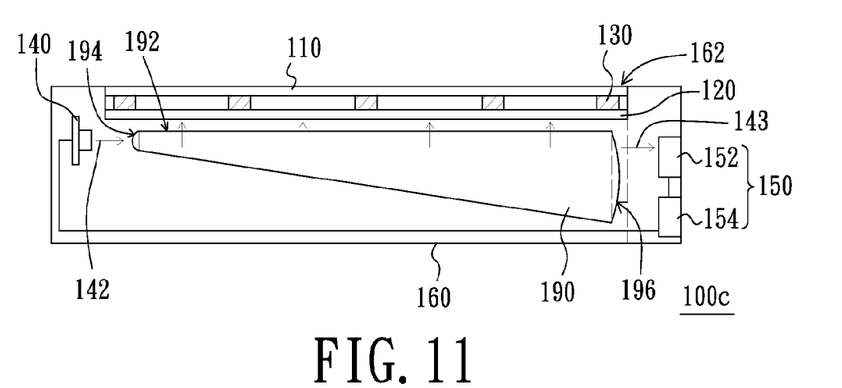
FIG. 11 shows a schematic view of an optical operating apparatus in accordance with another embodiment of the present disclosure.

Referring to FIG. 11, compared with the optical operating apparatus 100 of FIG. 3, the optical operating apparatus 100*e* of the present embodiment additionally includes a lens 190 disposed under the transparent supporting plate 120. The lens 190 includes a flat surface 192, a first convex curve surface 194, and a second convex curve surface 196. The first convex curve surface 194 and the second convex curve surface 196 are separately connect with two opposite ends of the flat surface 192. The flat surface 192 is opposite to the transparent supporting plate 120, and the first convex curve surface 194 is opposite to the second convex curve surface 196. The light source 140 is arranged adjacent to the first convex curve surface 194, and the image sensing module 150 is arranged adjacent to the second convex curve surface 196. The lens 190 integrated into the optical operating apparatus 100*e* facilitates the image sensing module 150 determining the deformation of the deformable unit 130.

Figure 12:
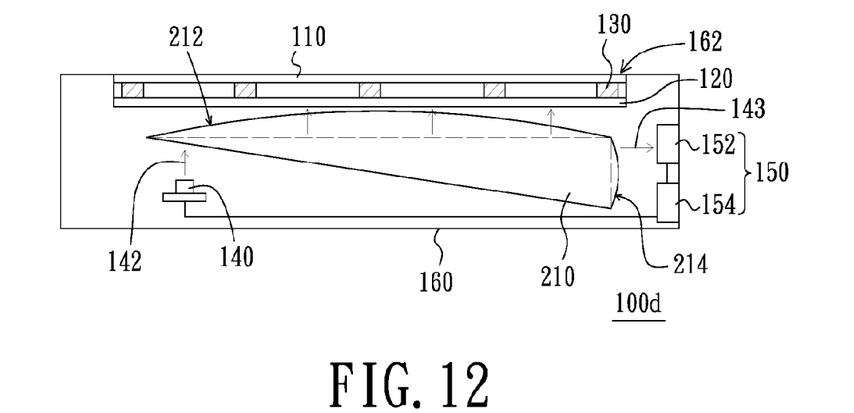
FIG. 12 shows a schematic view of an optical operating apparatus in accordance with another embodiment of the present disclosure.

Referring to FIG. 12, compared with the optical operating apparatus 100 of FIG. 3, the optical operating apparatus 100*d* of the present embodiment additionally includes a lens 210 disposed under the transparent supporting plate 120. The lens 210 includes a first convex curve surface 212 and a second convex curve surface 214 adjacent to the first convex curve surface 212. The first convex curve surface 212 is opposite to the transparent supporting plate 120, and the image sensing module 150 is arranged adjacent to the second convex curve surface 214. The lens 210 integrated into the optical operating apparatus 100*d* facilitates the image sensing module 150 determining the deformation of the deformable unit 130.

Figure 13:
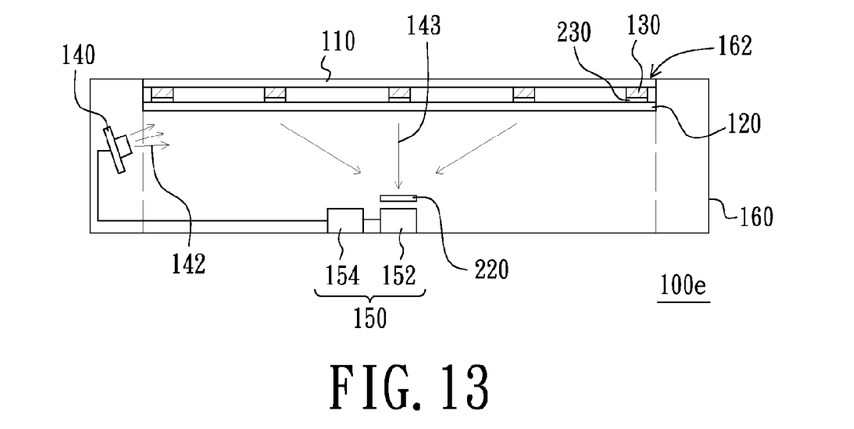
FIG. 13 shows a schematic view of an optical operating apparatus in accordance with another embodiment of the present disclosure.

Referring to FIG. 13, compared with the optical operating apparatus 100 of FIG. 3, the optical operating apparatus 100*e* of the present embodiment additionally includes a filter 220 and a reflective pattern layer 230. The light source 140 is an infrared light emitting diode (IR LED). A wavelength of the light beam 142 provided by the light source 140 is in a range from about 750 nanometers to about 950 nanometers. The filter 220 is disposed in front of the image sensing module 150 and is between the deformable unit 130 and the image sensing module 150, for filtering off the light rays whose wavelength are out of the above range (i.e., the range from about 750 nanometers to about 950 nanometers). The reflective pattern layer 230 is disposed between the deformable unit 130 and the transparent supporting plate 120 to reflect the light rays whose wavelength is in the above range (i.e., the range from about 750 nanometers to about 950 nanometers). A shape of the reflective pattern layer 230 is similar to that of the deformable unit 130.

In the optical operating apparatus 100*e*, the reflective pattern layer 230 is applied to reflect the light rays whose wavelength is in the above range, and the filter 220 is applied to filter off the light rays whose wavelength is out of the above range, thus, noise sensed by the image sensing module 150 can be greatly decreased, thereby improving a sensing precision of the optical operating apparatus 100*e*. In addition, the filter 220 and the reflective pattern layer 230 can be applied to the optical operating apparatus 100*a* to 100*d* (shown in FIGS. 9 to 12) of the above embodiments.

Accordingly, the light source 205 and the image sensor 201 may be disposed at proper positions under the touch plate as long as the image sensor 201 (or sensing element 152) is arranged to be able to receive reflected light from the touch plate directly or through an light guiding structure (e.g. 192 or 212) when at least one finger of the user is pressed thereon. In addition, since the switching module of the present invention may share the same light source, the same image sensor and the same processor with the optical navigation module, the switching module and the optical navigation module may be combined as a single module.

The operation field of all aforementioned embodiments can be divided into a collection of a plurality of sub-areas in light of the coordinate system the optical navigation module applies. Taking Cartesian coordinate system as an example, please refer to FIG. 2, it shows a schematic diagram of the operation field divided as a matrix of a plurality of sub-areas. It is assumed that the touched finger occupies the position 31 on the operation field and then moves to the position 32. The optical navigation module only needs to continuously sense which sub-area is touched by the finger for calculating the movement of the touched finger, then activated particular commands in response to the movement. Even more, the optical navigation module can only sense the start point and the end point when the touched finger moves to retrieve the moving direction of the touched finger, then activated particular commands in response to the moving information of the touched finger. That is, the position information of the at least one light spot in the image may be retrieved from a look-up table formed by dividing a field of view of the image sensor into a matrix of a plurality of sub-areas.

Figure 2:
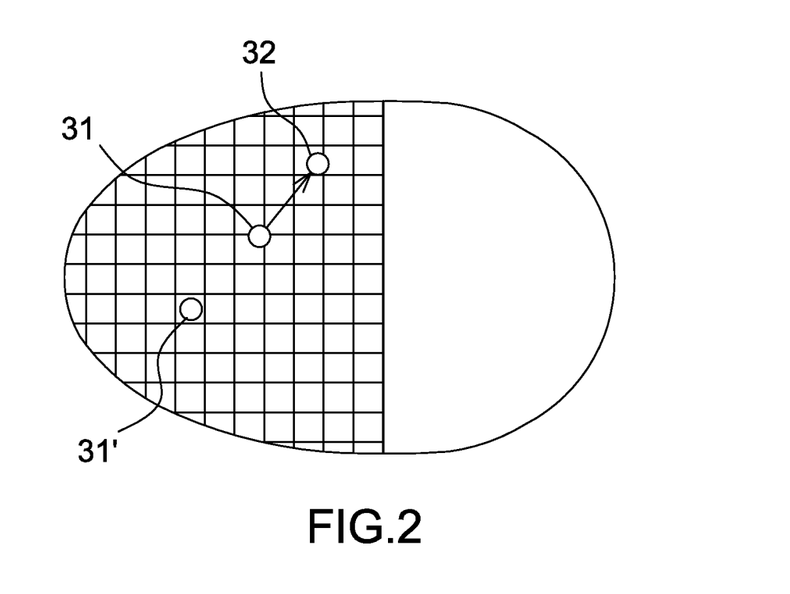
FIG. 2 shows a schematic diagram of the operation field divided as a matrix of a plurality of sub-areas.

When more than one fingers touch more than one sub-area at once, like the positions 31 and 31' shown in FIG. 2, the optical navigation module can estimate the position information by many ways such as, but not limited to, averaging corresponding coordinate values of the two sub-areas, taking the two sub-areas together as a start point, choosing the one sub-area which is occupied by the touched finger most, randomly choosing one of the touched sub-areas, etc. Meanwhile, the optical navigation module of the present disclosure may pre-store the position information of the sub-areas in advance, such as storing the position information in a look-up table stored in a memory device, and then retrieves the pre-stored position information when the finger touched the operation field so as to enhance the processing speed. Since the main objective of the optical navigation module is to determine the gesture or movement of the fingers, as long as the optical navigation module applies the same way to estimate the position information, the output of the optical navigation module can be applied to determine the gesture or movement of the fingers.

The aforementioned light source may be any conventional light source, such as LED, LD, IR, etc., and is not a limitation of the present disclosure. The advantage of applying IR as the light source is to use the invisible character thereof to prevent from affecting the user's sense of sight. The tracking data retrieved from the movement of the touched fingers are also available in assisting moving the pointer shown on the display. For example, when the optical navigation module senses the touched finger moving in a direction identical to the direction that the pointing module moves, e.g. the touched finger moves toward left as well as the pointing module moves the pointer toward left, the pointer may be accelerated in moving faster toward left. Or the optical navigation module can temporarily control the movement of the pointer, with or without the assistance of at least one key on a keyboard, by moving at least one finger on the operation field after the optical navigation module senses a particular gesture. The operation field and/or the image sensor of the aforementioned embodiments may be placed with a tilted angle for placing the fingers conveniently and easier sensing the image.

As mentioned above, conventional pointing devices with CTM or RTM have to be operated with relatively larger pressing force and have to be maintained in function-well condition. Therefore, the present disclosure provides a hybrid pointing device that may switch between a pointing module and an optical navigation module according to a deformation of a touch plate. A user may control the operation of the pointer on the display with a more instinctive way.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A hybrid pointing device for being operated by a user on a surface, the hybrid pointing device comprising:
    a transparent touch plate on a top surface of the hybrid pointing device, the transparent touch plate comprising:
        a soft plate configured for being pressed by the at least one finger;
        a supporting plate disposed under the soft plate; and
        a deformable unit fixed between the soft plate and the supporting plate and having a pattern configuration, wherein the deformable unit deforms as the soft plate is pressed and restores after the at least one finger is removed;
    a first module configured to sense a movement of the hybrid pointing device relative to the surface;
    a second module, comprising:
        a light source configured to emit light beams to the transparent touch plate; and
        an image sensor arranged under the supporting plate of the transparent touch plate and configured to capture an image covering the transparent touch plate; and
    a processor configured to detect a deformation of the transparent touch plate when at least one finger of the user presses thereon and to identify gestures according to a position information of at least one light spot in the image caused by the at least one finger in contact with the transparent touch plate.

2. The hybrid pointing device as claimed in claim 1, wherein the soft plate is a part of or an entire of the touch plate.

3. The hybrid pointing device as claimed in claim 1, wherein the deformable unit is made of an elastic material.

4. The hybrid pointing device as claimed in claim 1, wherein the pattern configuration is a predetermined reticular structure or a multi-line shaped structure.

5. The hybrid pointing device as claimed in claim 1, further comprising a reflective pattern layer disposed between the deformable unit and the supporting plate for reflecting light whose wavelengths are in a wavelength range of the light beams provided by the light source, wherein a shape of the reflective pattern layer is similar to a shape of the pattern configuration of the deformable unit.

6. The hybrid pointing device as claimed in claim 1, wherein the first module is activated when the deformation is smaller than a threshold of deformed size and the second module is activated when the deformation is larger than the threshold of deformed size.

7. The hybrid pointing device as claimed in claim 1, wherein the first module is an optical mouse module or a trackball mouse module.

8. The hybrid pointing device as claimed in claim 1, wherein the processor also calculates the movement sensed by the first module.

9. The hybrid pointing device as claimed in claim 1, wherein the position information of the at least one light spot in the image is retrieved from a look-up table formed by dividing a field of view of the image sensor into a matrix of a plurality of sub-areas.

10. The hybrid pointing device as claimed in claim 1, wherein the light source is also configured to illuminate the surface.

11. The hybrid pointing device as claimed in claim 1, wherein the light source and the second image sensor are disposed under the transparent touch plate.

12. A hybrid pointing device for being operated by a user on a surface, the hybrid pointing device comprising:
    a transparent touch plate on a top surface of the hybrid pointing device, the transparent touch plate comprising:
        a soft plate being a part of or an entire of the transparent touch plate;
        a supporting plate disposed under the soft plate; and
        a deformable unit fixed between the soft plate and the supporting plate and having a pattern configuration, wherein the deformable unit deforms as the soft plate is pressed by the at least one finger and restores after the at least one finger is removed;
    a light source configured to illuminate the transparent touch plate;
    a first image sensor configured to capture a first image of the surface;
    a second image sensor arranged under the supporting plate of the transparent touch plate and configured to capture a second image covering the transparent touch plate; and
    a processor configured to calculate a movement of the hybrid pointing device relative to the surface according to the first image, to detect a deformation of the transparent touch plate according to the second image and to identify gestures according to a position information of at least one light spot in the second image caused by at least one finger of the user in contact with the transparent touch plate.

13. The hybrid pointing device as claimed in claim 12, wherein the deformable unit is made of an elastic material.

14. The hybrid pointing device as claimed in claim 12, wherein the pattern configuration is a predetermined reticular structure or a multi-line shaped structure.

15. The hybrid pointing device as claimed in claim 12, further comprising a reflective pattern layer disposed between the deformable unit and the supporting plate for reflecting light whose wavelengths are in a wavelength range of light provided by the light source, wherein a shape of the reflective pattern layer is similar to a shape of the pattern configuration of the deformable unit.

16. The hybrid pointing device as claimed in claim 12, wherein the processor starts to identify the gestures when the deformation is larger than a threshold of deformed size.

17. The hybrid pointing device as claimed in claim 12, wherein when the deformation is smaller than a threshold of deformed size, the first image sensor has a higher sampling frequency than the second image sensor.

18. The hybrid pointing device as claimed in claim 12, wherein when the deformation is higher than a threshold of deformed size, a sampling frequency of the second image sensor is increased.

\* \* \* \* \*